United States Patent [19]

Nam

[11] Patent Number: 4,754,606
[45] Date of Patent: Jul. 5, 1988

[54] COMPOSITE ENGINE SYSTEM

[76] Inventor: Chul W. Nam, 61-9 Sinwol-Dong, Kangseo-Ku Seoul, Rep. of Korea

[21] Appl. No.: 844,703

[22] Filed: Mar. 27, 1986

[51] Int. Cl.$^4$ .............................................. F02G 5/02
[52] U.S. Cl. .................................................... 60/616
[58] Field of Search .......................... 60/616, 618, 716

[56] References Cited

U.S. PATENT DOCUMENTS

| | | | |
|---|---|---|---|
| 2,202,298 | 5/1940 | Park | 60/616 |
| 2,645,083 | 7/1953 | Brunner | 60/616 X |
| 3,830,062 | 8/1975 | Morgan et al. | 60/618 |
| 3,986,575 | 10/1976 | Eggmann | 60/616 X |
| 4,121,423 | 10/1978 | Querry et al. | 60/616 |

*Primary Examiner*—Michael Koczo

[57] ABSTRACT

The composite engine system is comprised of a main engine in which a composite engine is provided with a plurality of internal combustion cylinders and a plurality of external combustion cylinders installed integrally in one cylinder block and a dual flywheel structure; and one or more subsystems in connection with the external combustion cylinder, in which one subsystem has a closed loop of He gas and other subsystem has two closed loops of HE gas expanded by waste heat gas and a He gas expanding apparatus, whereby the composite engine system has a configuration consisting of a plurality of closed loops of He gas to enhance the net thermal efficiency of the whole engine as well as to lower the temperature of the exhaust gas, and further to have the effect of reducing the amount of exhaust gas resulting from a decreased number of fire cylinders being used.

4 Claims, 8 Drawing Sheets

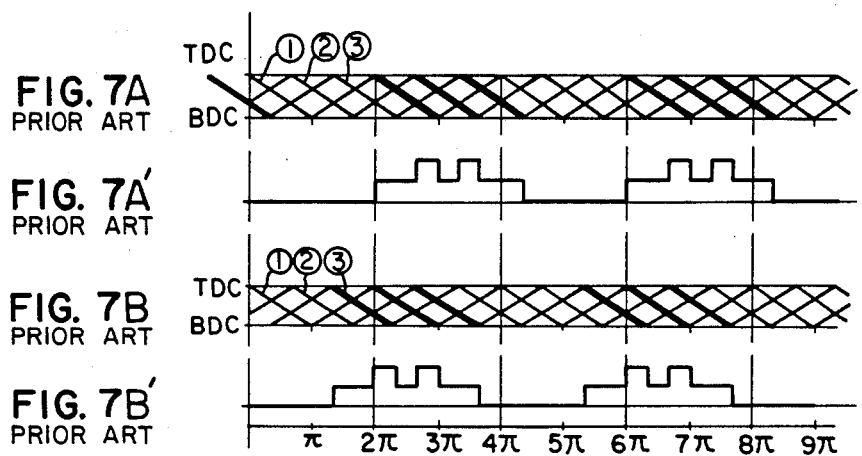
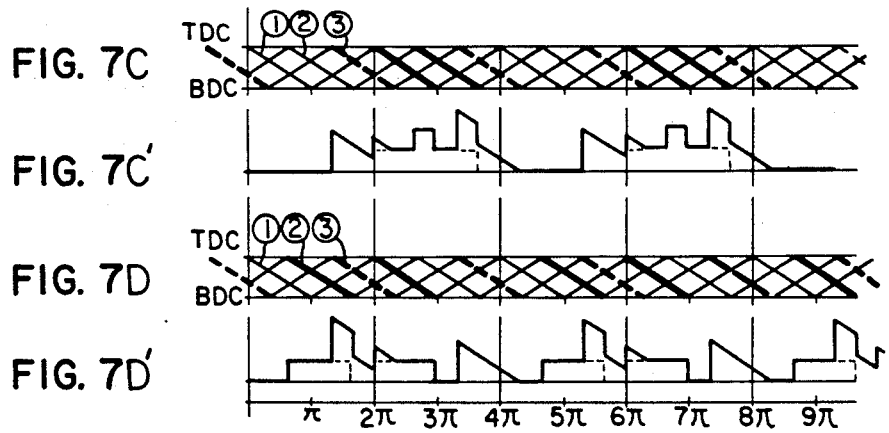

COMPOSITE ENGINE SYSTEM

This invention is related to providing a new type of engine for enhancing the net thermal efficiency of a gasoline engine, and particularly to provide a composite engine system.

A conventional engine may be classified according to the type of fuel used, and the type of cylinder arrangement such as an internal combustion engine and an external combustion engine. In an internal combustion engine, the combustion of the fuel takes place inside the engine cylinder, thereby directly forcing the piston to move downward. In an external combustion engine, the combustion takes place outside the engine and the external pressure generated by such combustion is applied to an engine cylinder, thereby forcing the piston to move downward.

These internal and external combustion engines have been used individually as separate engines. In the past, one or three cylinders were commonly used but the many advantages of a larger number of cylinders soon led to the adoption of 4-, 6-, 8-, 12- and 16- cylinder engines. Although the power stroke of each piston theoretically continues to 180 degrees of crankshaft rotation, best results can be obtained if the exhaust valve is opened when the power stroke has completed about four fifths of its travel. Therefore, the period that power is delivered during 720 degrees of crankshaft rotation, or one 4-stroke cycle, will be 145 degrees multiplied by the number of cylinders in the engine. If an engine has two cylinders, power will be transmitted for 290 degrees of the 720 degrees of travel necessary to complete the four events of the cycle.

As cylinders are added to an engine, each one must complete the four steps of the cycle during two revolutions of the crankshaft. If there are more than four cylinders, the power strokes overlap, and the length of overlap increases with the number of cylinders. For example the 6-cylinder engine overlaps a new power stroke starting each 120 degrees of crankshaft rotation and lasting for four-fifths of a stroke or 145 decrees. This provides an overlap of 25 degrees. In the 8- cylinder engine, a power stroke starts every 90 degrees and continues for 145 degrees, resulting in a 55 degrees overlap of power.

As described above, it is well known in the prior art that the number of cylinders can be increased to try enhancing the power and the smooth operation of the internal and external combustion engine.

This invention, however, breaks free from the concept of the conventional engine and innovatively constructs a new type of engine, the composite engine system. This composite engine system has a 4 cycle or 2 cycle engine with the cylinder block of an internal combustion engine containing a pluality of combustion cylinders. On this cylinder block is installed a plurality of external combustion cylinders as waste heat gas collecting cylinders. Further, a subsystem in connection with the waste heat gas collecting cylinders is installed. This type of cylinder block will generate equivalent or greater power than that of an engine with the same number of cylinders installed on one cylinder block.

Accordingly, the main engine of a composite engine has a predetermined number of external combustion engine cylinders (which is referred to as waste heat gas collecting cylinders below) along with a predetermined number of internal combustion engine cylinders (which are referred to as fire cylinders below). The cylinders are formed integrally on one cylinder block to obtain the power designed to be produced by a 3- or 4- or -16 cylinder engine.

For example, the composite engine, composed of three cylinders in a manner that two fire cylinders and one waste heat gas collecting cylinder are coupled with each other on one cylinder block, will generate the power identical to or greater than that of an internal combustion engine having three cylinders. Here the waste heat gas collecting cylinder is provided with a heating chamber receiving waste heat gas from the fire cylinder, two or more pipes communicate with an external inert He gas main supply tank, an expanding chamber receives the inert He gas through pipes and a discharge port exhausts gas from the heating chamber to the outside so that the He gas introduced into He gas expanding chamber is expanded by the waste heat gas from the two fire cylinders, thereby forcing the piston to move downward.

The two fire cylinders are arranged adjacent to a waste heat gas collecting cylinder to have an exhaust passage communicating with a heating chamber of the waste heat gas collecting cylinder and are installed parallel on both sides of the waste heat gas collecting cylinder on one cylinder block to operate the 4-cycle stroke of the internal combustion engine. Also this composite engine of the main engine can be constructed so that the arrangement consisting of a predetermined number of fire cylinders and waste heat gas collecting cylinders is identical to that of a 3-, 4-, or 16-cylinder as well as being of the in-line type or the V-type.

All of the reciprocating pistons mounted respectively in each cylinder can be connected to one crankshaft or can be connected to two crankshafts by being divided into two groups. The main engine is provided with one flywheel having a starter motor connected through a gear to a crankshaft, and a second flywheel connected with the gear of a high speed pneumatic compressor vane motor. In between these flywheels is installed a power transmitting device with a power transmitting shaft that is connected to a crankshaft.

The power transmitting device consists of two power transmitting wheels, which, depending on the energization of each magnetic coil which is mounted on the cylinder block and the fixed bracket of the main engine, activates the electronic clutch of the first and second flywheel. When the auto is in a driving state, the first power transmitting wheel is coupled to the first flywheel. When the auto is in an idle stage, the second (rear) power transmitting wheel is coupled to the second flywheel. Also, there is a supporting wheel for supporting the first and second power tranmitting wheel.

Further, this invention is comprised of one or more subsystems related to He gas and to the waste heat gas collecting cylinder. The first subsystem has a closed loop of He gas. This subsystem is provided with the main He supply tank and the sub He supply tank to supply to a solenoid intake valve, the He gas compressed under high pressure by a vane compressor directed to an electric motor.

A solenoid intake valve having an additional He gas accumulator supplies the He gas through a water cooled heat exchanger to the He gas receiving chamber of a waste heat gas collecting cylinder during the opening of the valve responsive to the energization of its solenoid coil. Then, the He gas expanded in the receiving chamber of a waste heat gas collection cylinder forces the piston to move downward. The He gas is then discharged through two or more pipes and cooled at a heat exchanger.

The cooled He gas is supplied to a solenoid intake valve and is by-passed by means of a spring type valve to be provided to a solenoid exhaust valve. Then a solenoid exhaust valve, depending on the energization of its solenoid coil, opens its valve and restores the He gas to the main supply tank. Furthermore, a heat exchanger of the first subsystem is provided with a plurality of pipes having many cooling fins, an input port and output port for taking in the cooling water or discharging the heating water, respectively.

The heating water, which cooled the expanded He gas, is introduced through a water distributor into a radiator for a waste heat gas collecting cylinder which is mounted on a cylinder block of the main engine and is cooled. The cooling water is supplied through a water distributor to a heat exchanger by means of a water pump and cools the expanded He gas passing through the heat exchanger.

The second subsystem for the He gas expanded by the waste heat gas has two closed loops and is constructed to utilize waste heat gas, thereby assisting the operation of a composite engine.

The waste heat gas exhausted from a composite engine is introduced into a He gas expanding apparatus according to the principal of this invention and is then supplied to a swash plate type external combustion engine. An electric generator, directed by a swash plate type external combustion engine, is operated to generate the electric power, while, at the same time, the waste heat gas makes a turbo charger operate by its remaining heat energy, thereby applying compressed air into the fire cylinder of a composite engine.

In another closed loop, the He gas from a supply tank is supplied through a He gas distributor to one pipe of a heat exchanger, which is independent of the heat exchanger of the first subsystem. The cooled He gas is introduced into a He gas expanding apparatus by means of the first and second pipes installed in the gas expanding apparatus. Thereafter, the expanded He gas, passing through the first and second pipes, is supplied simultaneously to the first and second vane motors which are engaged with the gears of a gear box so that when the automobile is in idle, the gears installed in the gear box are rotated.

The He gas passing through a vane motor is supplied to a vane pump which is directed to an electric generator for generating electric power. The vane pump gets the He gas to recirculate to a heat exchanger. At this time, the gears installed in a gear box are rotated, thereby rotating a bevel gear fixed on the middle of the power transmitting shaft located in the front of a gear box, as well as rotating two bevel gears engaged, symmetrically, on the top and bottom with the bevel gear. Further, the air compressor that is directly connected to the two bevel gears is operated, thereby storing compressed air at the compressed air tank. Therefore, if necessary, the compressed air is supplied to still another vane motor. This vane motor rotates, by means of the gears of the gear box, the second flywheel which is coupled with the vane motor, thereby obtaining high torque of the second flywheel.

In the other closed loop, the He gas passing through the remaining pipe of a heat exchanger from a He gas storage tank is supplied to one stage of a two stage gas compressor turbine which is directly connected to the gears in the gear box of the main engine. This compressor turbine supplies the He gas to the third and fourth pipes of the He gas expanding apparatus. The expanded He gas passing through the third and fourth pipes is supplied to the second stage expanding turbine of the two stage compressor turbine so that the second stage expanding turbine rotates its gears, which are engaged with the gears of the gear box thereby increasing the torque of the second flywheel. The He gas from the second stage expanding turbine is then supplied to a heat exchanger to be cooled.

Further in accordance with this invention, a He gas expanding apparatus is characterized in that a hollow He gas expanding tank is mounted at the center of it by means of a plurality of supporting elements and two He gas pipes for introducing He gas into it are fixed to both the left and right of said tank adjacent to the left end as shown in the drawings. Two He gas pipes for discharging from it are fixed to both the left and right of said tank adjacent to the right as shown in the drawings and connected to outside elements, respectively.

A coil type pipe, having a relatively smaller diameter, and a coil type pipe having a relatively larger diameter are concentrically surrounded around the said tank at the center. These pipes are provided with two He gas inlet pipes and two He gas outlet pipes which are fixed on the left and right portion of the pipes, adjacent to the right side as shown in the drawings.

Therefore this invention is characterized in that in the main engine, a composite engine is provided with a predetermined number of fire cylinders and a predetermined number of waste heat gas collecting cylinders for forcing the piston to move downward by expanding the He gas flowing into it, thereby obtaining a power greater than that generated by an internal combustion engine having the same number of cylinders.

For example, a composite engine which is provided with two fire cylinders and one waste heat gas collecting cylinder in one cylinder block generates the power identical to or greater than that of the internal combustion engine which is provided with only three fire cylinders. In addition, the waste heat gas is supplied to a He gas expanding apparatus, thereby generating electric power by an electric motor coupled through a swash plate type external combustion engine.

The He gas is introduced into a He gas expanding apparatus by means of a plurality of pipes, and the expanded He gas operates a vane motor which rotates gears of a gear box as well as, during the idle operation of the automobile, increasing the torque force of a second flywheel to store energy while rotating the bevel gear installed in front of a gear box. Therefore, an air compressor coupled with this bevel gear is operated to store the compressed air at the compressed air storage tank, and, if necessary, this compressed air is supplied to a vane motor to increase the torque force of a second flywheel. The expanded He gas from a He gas expanding apparatus is supplied to a He gas turbine to rotate gears in a gear box.

Accordingly, this invention has a path consisting of a composite closed loop of He gas to enhance the net thermal efficiency of the whole engine as well as to lower the temperature of the exhaust gas further than does a conventional engine, and has the effect of reducing the amount of the exhaust gas as a result of reducing the number of fire cylinders.

This invention has various advantages obtained by having a dual flywheel structure that, during the operation of automobiles, allows the torque of the crankshaft to be transmitted to the wheels of automobiles and during the idle operation of automobiles, stores the compressed energy resulting from the inert and compressed air produced by the second flywheel. Furthermore, electric power is generated by a swash plate type external combustion engine connected to a He gas expanding apparatus and an electric generator. A turbo charger, operated by the waste heat gas from the swash plate type external combustion engine, acts to inject the compressed air into a predetermined fire cylinder.

Accordingly, the primary object of this invention is to provide a new composite engine system for enhancing net thermal efficiency.

Another objective of this invention is to provide a new main engine in which a composite engine includes a predetermined number of waste heat gas collecting cylinders in one cylinder block with a reciprocating piston installed in each cylinder connected to either a single crankshaft or two crankshafts and including a dual flywheel structure coupled to a crankshaft.

Another objective of this invention is to provide a first subsystem to the main engine consisting of a closed loop that gets the He gas to expand in a waste heat gas collecting cylinder of the composite engine.

Another objective of this invention is to provide a second subsystem to the main engine consisting of two closed loops. In one closed loop the waste heat gas from the waste heat gas collecting cylinder is supplied to the He gas expanding apparatus and then to a swash plate type external combustion engine. Also, the He gas from the heat exchanger is passed through the He gas expanding apparatus with a part of the expanded gas being supplied to the air compressor and converted into compressed air which is then recirculated to the heat exchanger. In the second closed loop, the remaining expanded He gas passing through the compressed turbine is supplied to the second stage He gas expanding turbine to rotate the gears in the gear box of the main engine and, then, is recirculated to a heat exchanger.

Another objective of this invention is to drive a swash plate type external combustion engine with the waste heat gas which passed through a He gas expanding apparatus, thereby generating the electric power by a electric generator directly connected to it, and thereafter to drive a turbocharger by the waste heat gas from the swash plate type external combustion engine, thereby getting it to inject the compressed air into a fire cylinder of the main engine.

These and other objectives and advantages of this invention will become clear from the following description with reference to the accompanying drawings, wherein.

Figure 5A:
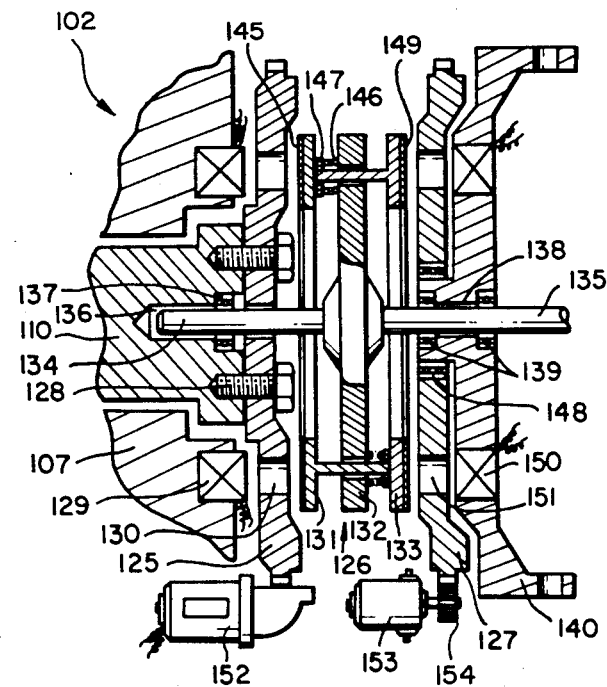

FIGS. 5A and B are views showing a flywheel structure according to this invention.

Figure 6:
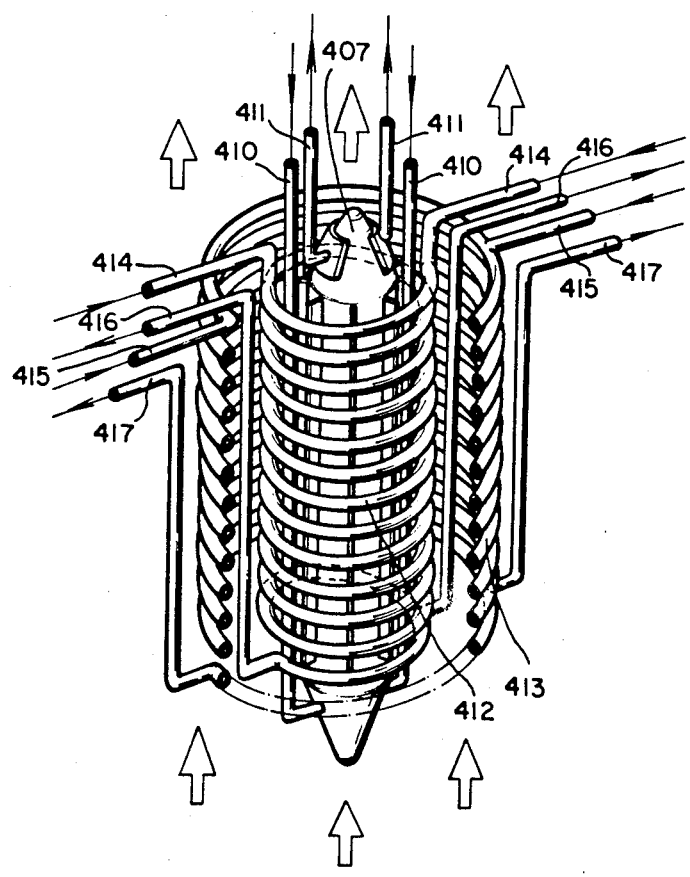

FIG. 6 is a view showing the inner portion of a He gas expanding apparatus according to this invention.

FIGS. 7A, 7A', 7B and 7B' are graphs showing the relationship between the operation and the power of a conventional engine while FIGS. 7C, 7C', 7D and 7D' are graphs showing the relationship between the operation and the power of a composite engine according to this invention.

Figure 8:
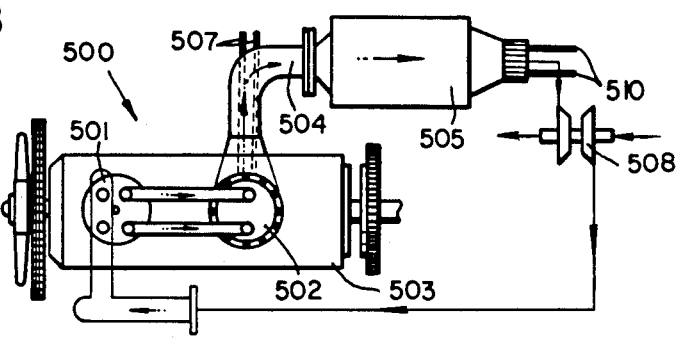
Figure 9:
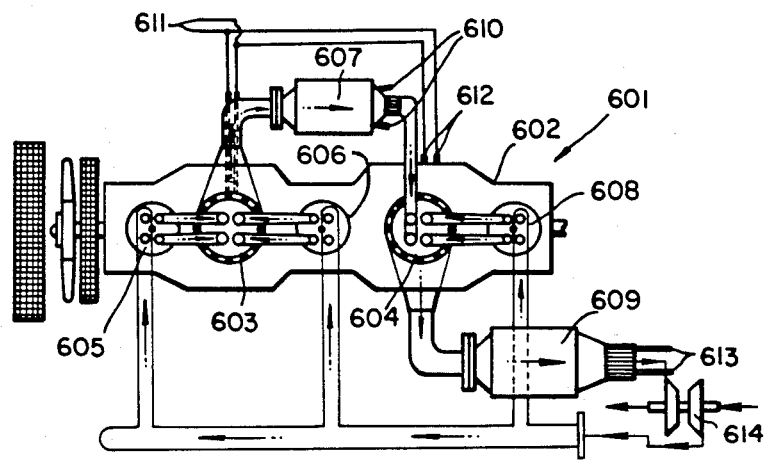
Figure 10:
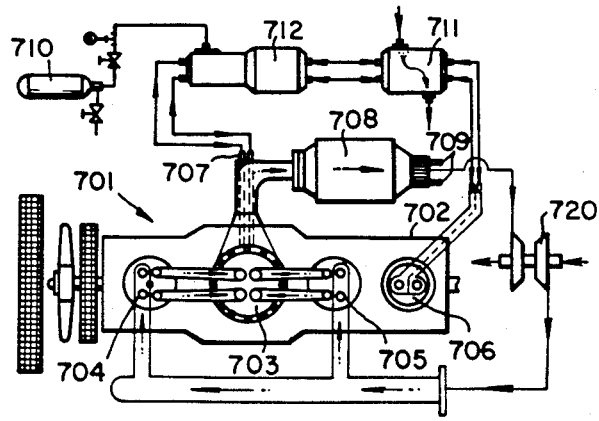

FIG. 8, FIG. 9 and FIG. 10 are views showing the various alternative embodiments according to this invention.

Figure 1:
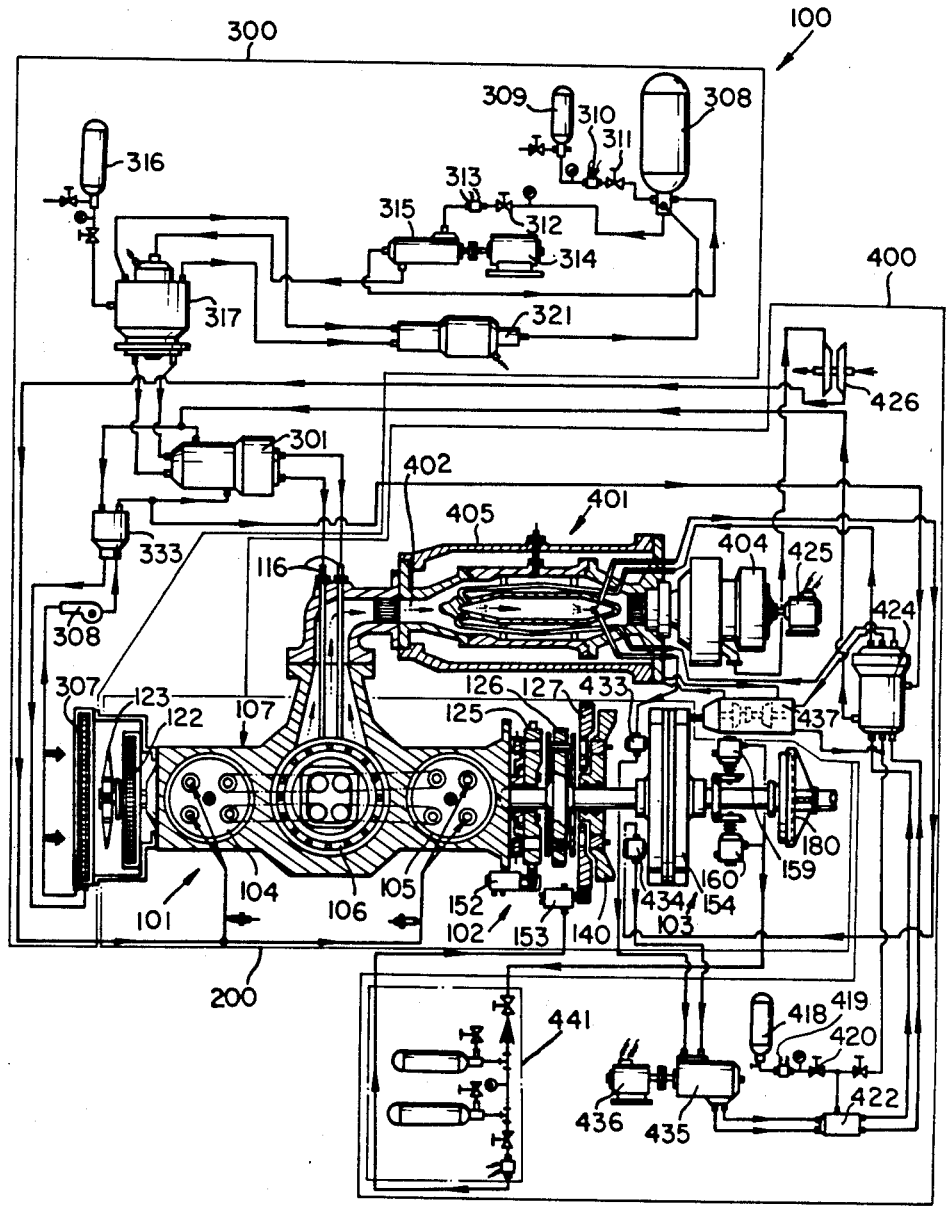
FIG. 1 is a schematical block diagram of the composite engine system according to this invention.

Referring to FIG. 1, the composite engine system 100 of this invention comprises the main engine 200, the first subsystem 300 and the second subsystem 400. The main engine 200 consists of the composite engine 101, two fire cylinders 104 and 105 and one waste heat gas collecting cylinder 106, all mounted in one cylinder block. The composite engine system 100 also includes a dual flywheel structure 102 and a gear box portion 103.

The first subsystem 300 has one closed loop path for supplying the He gas to the waste heat gas cylinder 106 and recirculating therefrom and another closed loop path for cooling water for cooling and expanding He gas from waste heat gas collecting cylinder. The composite engine system's second subsystem 400 has two closed loop paths for producing compressed air with a part of the expanded He gas and for increasing the torque force of the flywheel structure 102 with the remainder of texpanded He gas while the waste heat gas is passing through a He gas expanding apparatus 401 (as will be explained below) and a configuration for operating the swash plate type external combustion engine 404 with waste heat gas.

Electric power is generated by the electric generator 425 which is directly connected to the external combustion engine 404. Waste heat also drives a turbo charger 426 to inject compressed air into the fire cylinders 104 and 105.

A detailed description in connection with the important apparatus of the composite engine system 100 is as follows:

1. Main Engine

As illustrated in FIG. 1, FIG. 2, FIG. 4 and FIG. 5, the waste heat gas collecting cylinder of the main engine 200 in accordance with this invention is involved in first and second subsystem 300 and 400. The main engine 200 includes the composite engine 101 provided with two fire cylinders 104 and 105 and the waste heat gas collecting cylinder 106. However, the volume of waste heat gas collecting cylinder 106 is identical to the sum of the volumes of fire cylinders 104 and 105.

The composite engine 101 comprises one cylinder block 107 which is provided with one cylinder head block 108, one cylinder block 109, crankshaft 110 and three reciprocating pistons 111', 112', 113' connected to it. More specifically, the cylinder head block 108 has camshaft 114 fixed to its upper portion and intake valves 115 and exhaust valves 115' are positioned by means of a plurality of push rods 115', onto fire chambers 111 and 113 of each fire cylinder 104 and 105, respectively.

Figure 4:
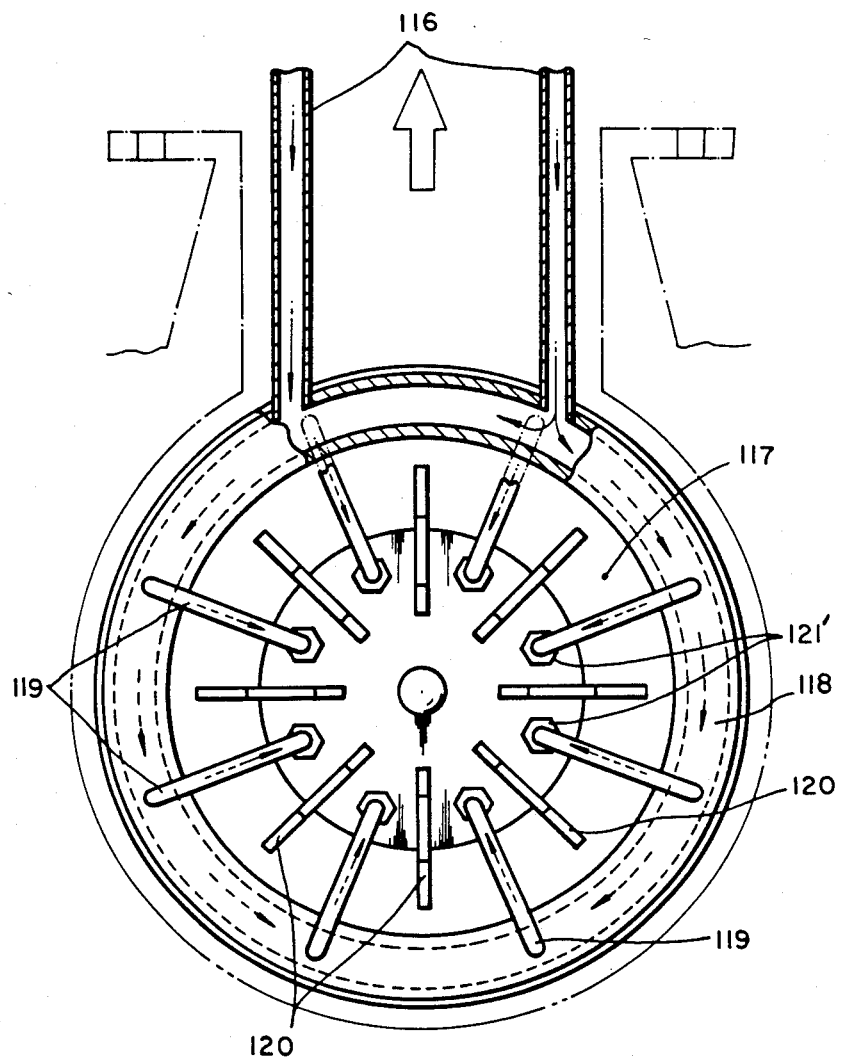
FIG. 4 is a view showing the waste heat gas collecting cylinder head of a composite engine according to this invention.

Also, as shown in FIG. 4, a cone shaped cylinder head 117 is screwed to cylinder block 109 and He gas inflow pipe 116 is fixed to communicate with the He gas ring 118 which surrounds the periphery of the cone shaped cylinder head 117 and has He gas passages. A plurality of He gas pipes, for example 8 pipes, are arranged radially on the circumference of He gas ring 118, one end of which is fixed to the He gas ring 118 and other end of which is fixed to the cone shaped cylinder head 117 by means of bolts 121' etc.

Here, the He gas is introduced into or discharged from He gas receiving chamber 112 of the waste heat gas collecting cylinder 106. Heating fins 120 are fixed to the intermediate position between two He gas pipes arranged radially on the circumference of cylinder head 117. Within the cylinder head block 108 is mounted the exhaust valves 115' of the two fire chambers 111 and 113. The cylinder head block 108 also contains the hollow space of the He gas heating chamber 121 which communicates with the exhaust passage 169. Additionally, a radiator 122 is fixed to the cylinder block 108 of the main engine 200, as contructed in a prior art. Cooling fan 123 is fixed to the shaft of gear 124, that is engaged with a power transmitting gear (not shown) of crankshaft 110.

Figure 5B:
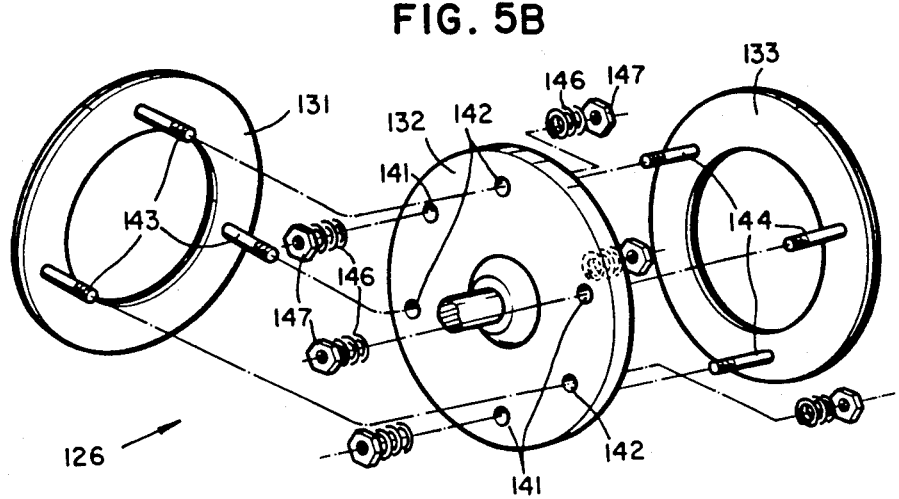

As shown in FIG. 5A and FIG. 5B, the flywheel structure 102 is mounted to one end of crankshaft 100 in the cylinder block 107 and comprises the first flywheel 125 which is fixed to one end of crankshaft 110 by bolts 128, the power transmitting device 126 for transmitting the torque force of the crankshaft 110 and the second flywheel 127 for storing the energy produced by the second subsystem 400. Also, the first flywheel 125 has two or more ferromagnetic inserts 130 fixed at a predetermined circumferential and radial positions.

The power transmitting wheel structure 126 is provided with a first forwardly and backwardly moveable power transmitting wheel 131 faced against the first fly 125 wheel 133, a second forwardly and backwardly moveable power transmitting wheel 133 faced against the second flywheel 127 and a supporting wheel 132, positioned therebetween for supporting the first and second power transmitting wheels 131 and 133. Supporting wheel 132 has two power transmitting wheels 131 and 133. Supporting wheel 132 has two power transmitting shafts 134 and 135 fixed at its center, projecting from both sides.

The left shaft 134 in the drawings is rotatably inserted into hole 136 through bearing 137, passing through the center portions of the first power transmitting wheel 131 and first flywheel 125. The right shaft 135 in the drawing is rotatably inserted into and passed through a central hole 138 of a fixed bracket 140 having two bearings 139, through the second power transmitting wheel 133 and the second flywheel 127. Also, the supporting wheel 132 has a predetermined hole perforated in a predetermined position adjacent to its circumference.

For example, in the drawings, there are six holes 141 and 142 in supporting wheel 132 which can alternatively have inserted into it 3 supporting pins 143 which are fixed to the first power transmitting wheel 131 and 3 supporting pins 144 which are fixed to the second power transmitting wheel 133. After supporting pins 143 and 144 are inserted into the six holes of supporting wheel 132, first return springs 146 are inserted from threaded ends of supporting pins 143 and 144 and then nuts 147 are threaded into and fixed to the other threaded ends of supporting pin 143 and 144. Accordingly, the first and second power transmitting wheels 131 and 133 can be moved forward and backward by the elasticity of the return springs 146.

Second flywheel 127 is rotatably fixed through bearing 148 to the center portion projected from fixed bracket 140 in which ferromagnetic inserts 151 are mounted at a predetermined circumferential and radial position against a magnet coil 150 mounted to fixed bracket 140. Here it is noted that first and second power transmitting wheels 131 and 133 have ferrite friction surfaces 159 and 160 formed on their faces to contact with ferrite magnetic inserts 130 and 151 which face the first and second flywheels 125 and 127.

The starter motor 152 of the composite engine is coupled to the lower portion of the first flywheel 125. The high speed compressed air vane motor 153 is coupled to the lower portion of the second flywheel 127. This vane motor 153 can be operated through the gear box 154 and the rotation of the second flywheel 127.

Figure 3:
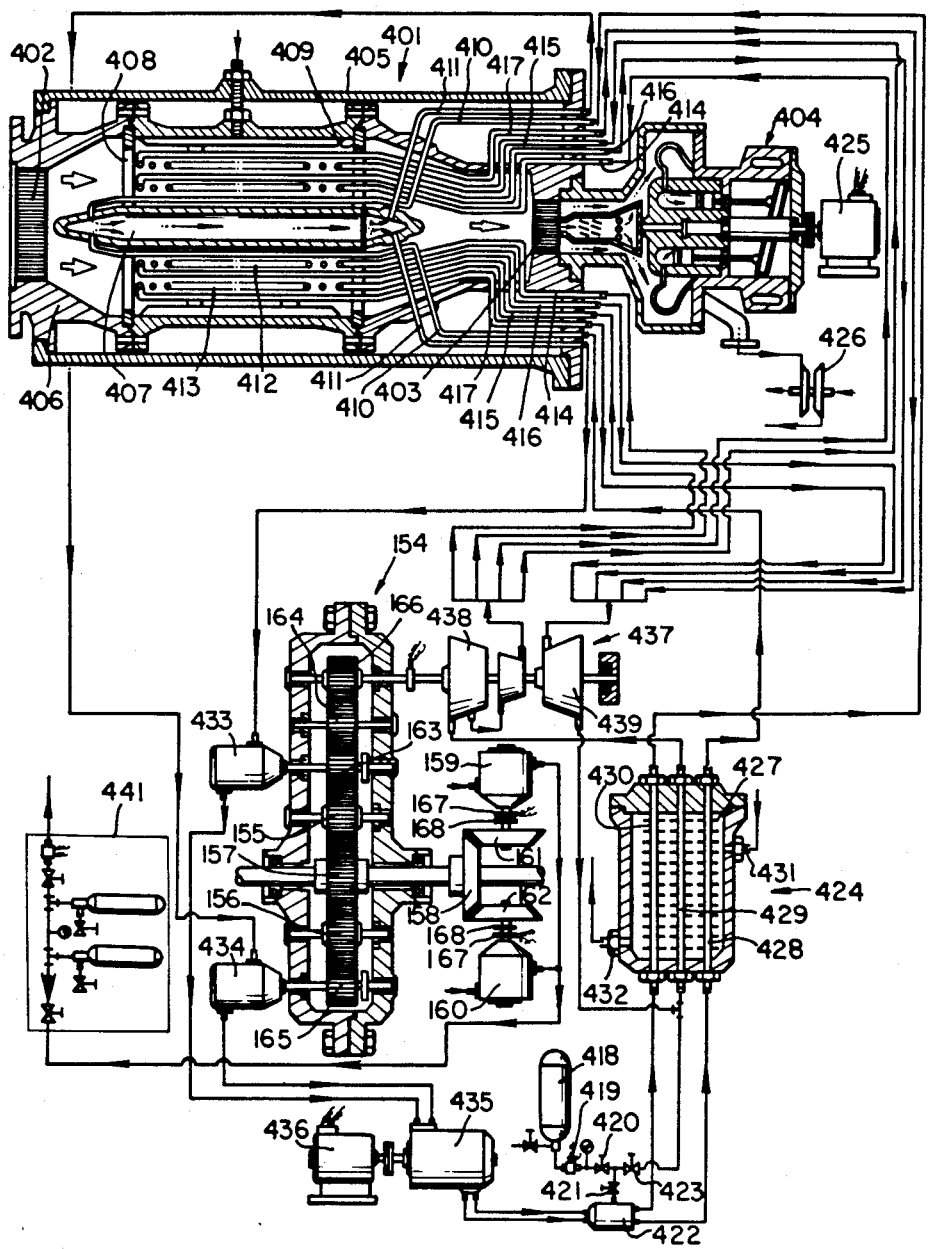
FIG. 3 is a view showing the second subsystem according to this invention.

As seen in FIG. 3, the right shaft 135 of power transmitting wheel 126 is fixed to gear 157 engaged with gears 155 and 156 of gear box 154 and is extended to drive bevel gear 158 mounted adjacent to the front of the gear box 154 (as described in detail below). This bevel gear 158 engages bevel gears 161 and 162 which is coupled through an electronic clutch 167 and coupler 168 to air compressors 159 and 160. Further, as in a conventional engine, electric clutch 180 is mounted at a predetermined position of power transmitting shaft 135.

2. First subsystem

Figure 2:
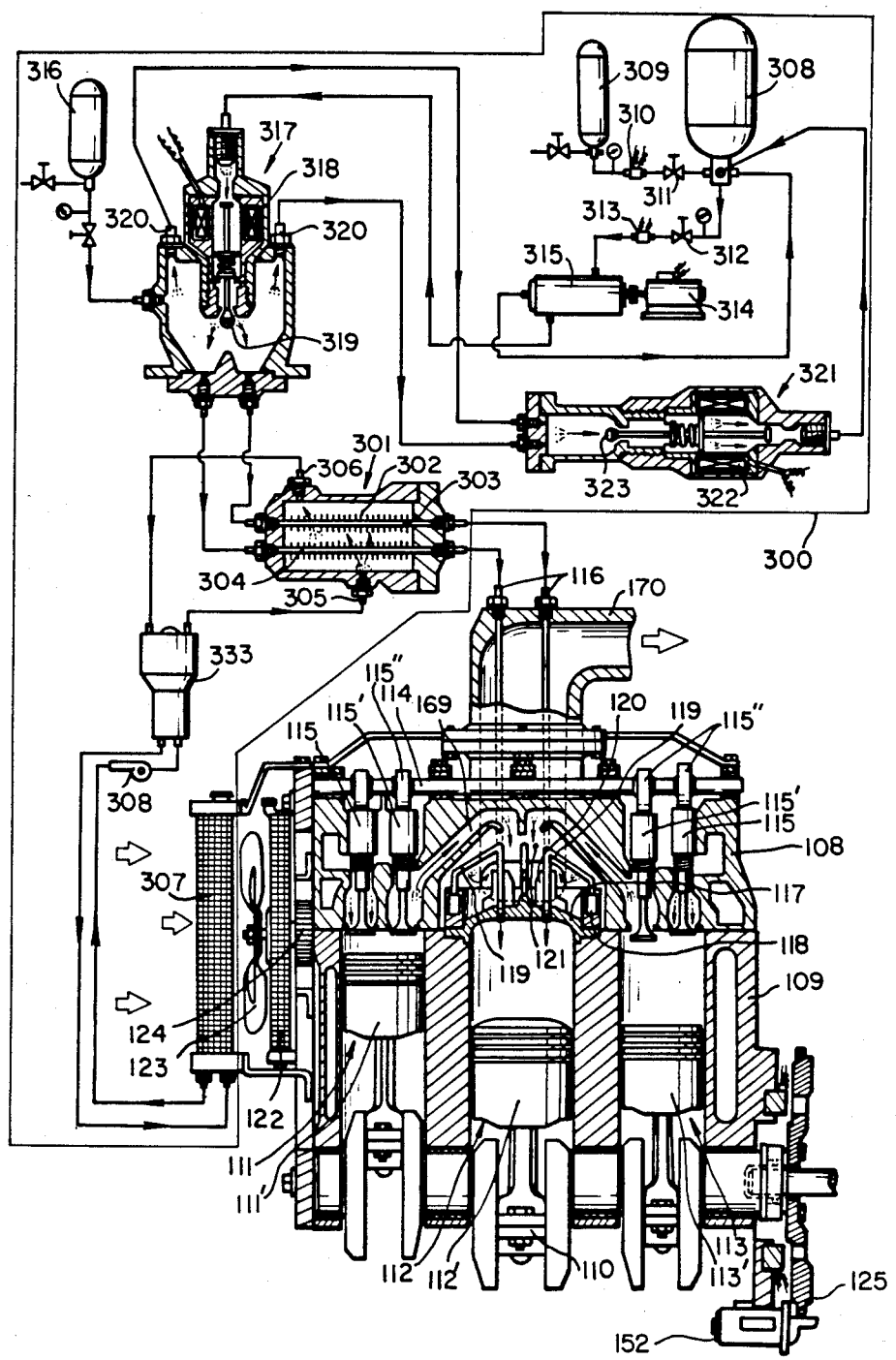
FIG. 2 is a view showing a composite engine and the first subsystem according to this invention.

Referring to FIG. 1 and FIG. 2, the first subsystem 300 is comprised of a closed loop path in which the expanded He gas which passed through the heat exchanger 301 is introduced into the receiving chamber 112 of waste heat gas collecting cylinder 106 of composite engine 101 and forces the reciprocating piston 112' to move downward. When the piston 112' reciprocates upward, the He gas is supplied to the heat exchanger 301 where it is water cooled and, then, stored in supply tank 308.

Specifically, heat exchanger 301 is provided with two He gas pipes 303 and 304 having a plurality of cooling fins 302 which are passed through its hollow inner portion. An inlet port 305 and an outlet port 306 are provided for introducing and discharging the cooling water. Therefore the cooling water, passing through heat exchanger 301 and through water distributor 333, is supplied to radiator 307 which is fixed to the cylinder block.

The radiator 307 is arranged in front of cooling fan 123 parallel to radiator 122 which is used with fire cylinders 104 and 105. The temperature of the cooling water is decreased at radiator 307 and is therefore supplied to cooling water supply pump 308' where it is used to cool the high temperature of expanded He gas from waste heat gas collecting cylinder 106.

On the other hand, the He gas supplied to composite engine 101 is obtained from He gas main supply tank 308, supplemented by auxiliary He gas supply tank 309, if necessary, which communicates with it through electronic valve 310 and valve 311. The He gas from main supply tank 308 is supplied through electronic valve 313 to vane compressor 315 which is operated by electric motor 314.

The He gas is compressed at a predetermined pressure, and then is supplied to solenoid intake valve 317 having a second auxiliary He gas tank 316. At this time electric magnetic coil 318 installed in solenoid intake valve 317 is energized and solenoid valve 319, cooperating with electric magnetic coil 318, is opended to receive the He gas into it.

The He gas is supplied through pipes 303 and 304 of heat exchanger 301 to receiving chamber 112 of waste heat gas collecting cylinder 106. Thereafter, the expanded He gas from receiving chamber 112 is cooled during its passage through pipes 303 and 304 of heat exchanger 30 and then supplied to solenoid intake valve 317.

At this time spring type valve 320 mounted in solenoid intake valve 317 is opened so that the He gas is supplied to solenoid outlet valve 321. The electro-magnetic valve 322 mounted in solenoid outlet valve 321 is energized and, in cooperation with valve 323, forces the He gas into main supply tank 308 through solenoid intake valve 317 and heat exchanger 301 to composite engine 101 and again is recirculated through heat exchanger 301, solenoid intake valve 317 and solenoid outlet valve 321 to be stored at main supply tank 308.

3. Second subsystem

Referring to FIG. 1, FIG. 3 and FIG. 6, a second subsystem 400 is provided with He gas expanding apparatus 401 so that the power of main engine 200 may be increased by utilizing expanded He gas during passage through expanding apparatus 401. Specifically, He gas expanding apparatus 401 is constructed so that its inlet port 402, which allows inflow of the He gas from waste heat gas collecting cylinder 106, is fixed at one end of waste heat gas flange 170 to allow communication with the gas flange 170.

The outlet port 403 is connected to swash plate type external combustion engine 404. He gas expanding apparatus 401 comprises an outer case 405 which has inner block 406 mounted in it. Also, hollow He gas expanding tank 407 is mounted to supporters 408 and 409 which are positioned at the center of inner block 406 as shown in FIG. 3.

This hollow He gas expanding tank 407 is provided with two inflow pipes 410 which are fixed adjacent to its lower portion for allowing the inflow of He gas as well as with two discharging pipes 411 which are fixed to its upper portion for discharging the expanding He gas. Also, two coil type pipes 412 and 413 surround the circumference of expanding tank 407 and are securely mounted in inner block 406 by supporters 408 and 409.

Here, first coil type pipe 412 is positioned adjacent to expanding tank 407 and second coil type pipe 413 is positioned around the outside of first coil type pipe 412, which has a diameter smaller than that of second coil type pipe 413.

Each of these pipes 412 and 413 has two He gas inflow pipes 414 and 415 fixed on its lower portion and two He gas discharging pipes 416 and 417 fixed on its upper portion. These pipes 414, 415, 416 and 417 are extended outside the upper portion of casing 405. Therefore, the He gas expanding apparatus 401 forces the He gas through He gas expanding tank 407, first coil type pipes 412 and second coil type pipes 413 and then, as the He gas passes through waste heat gas collecting cylinder 106, it greatly expands.

In the second subsystem 400, the waste heat gas, which is passed through the gas expanding apparatus 401, is supplied to swash plate type external combustion engine 404 that is coupled to He gas expanding apparatus 401 in order to activate operation of the swash plate type external combustion engine 404 which drives an electric generator 425, that is coupled to it to generate electric power for automobiles. The waste heat gas is also supplied to turbo charger 426 which begins injecting compressed air into the two fire cylinders 104 and 105 of composite engine 101.

Also, second subsystem 400 has a configuration consisting of two closed loop paths which allow He gas to pass through the He gas expanding apparatus 401. In one closed loop, the He gas is supplied from a supply tank 418 through electronic valve 419 and valves 420 and 423 to heat exchanger 424. Heat exchanger 424 has three pipes 428, 429 and 430 with a plurality of cooling fins 427 which have been installed upon them. The heat exchanger 424 has an inlet port 431 allowing inflow of the cooling water from heat exchanger 301 of first subsystem 300 and outlet port 432 for discharging the water heated by expanding He gas along with the heated water from heat exchanger 301. Heat exchanger 424 allows the He gas from He gas supply tank 418 to flow through pipes 428 and 430 into two inflow pipes 410 and then to release the expanded He gas from discharging pipes 411 after passage through expanding apparatus 401.

A part of the expanded He gas operates high pressure gas vane motor 433 having gear 163 on its shaft which is engaged with two gears 164 and 155 of gear box 154 while the remainder of the expanded He gas operates high pressure gas vane motor 434 having gear 165 on its shaft which is engaged with gear 156 of gear box 154. Then, all of the expanded He gas is supplied to operate high pressure vane compressor 435 which, in turn, activates electric generator 436 to generate electric power. Then the He gas is again supplied to heat exchanger 424. In this fashion, circulation of the He gas within the closed loop through hollow He gas expanding tank 407 is accomplished.

Also, the He gas passing through another pipe 429 of heat exchanger 424 is supplied to the first stage 438 of He gas turbine 437 and then introduced into first and second inflow pipes 414 and 415. The expanded He gas is exhausted from discharging pipes 416 and 417 and supplied to second stage 439 of He gas turbine 437 to drive He gas turbine 437, thereby rotating gear 166 in gear box 154 which is mounted on the shaft of turbine 437. Then the He gas is again recirculated to heat exchanger 424, completing another closed loop for the He gas.

On the other hand, when gear 166 connected to turbine 437 is operated by the He gas circulating within the closed loop, and gears 163 and 165 connected to vane motor 433 and 434, respectively, begin to rotate, gear 157 in gear box 154 and power transmitting shaft 135 are rotated. Bevel gear 158 which is attached to shaft 135 and coupled bevel gears 161 and 162 are operated through coupling 168 and electric clutch 167 which are independently attached to air compressors 182 and 184. By this operation, compressed air is stored in compressed air tank 441 which supplies compressed air to the compressed air vane motor 153, if necessary. The electronic clutches 167 controllably connected to air compressors 159 and 160, allow bevel gears 161 and 162 to rotate idly when air compressors 159 and 160 are in an overload state.

4. Operations

To operate composite engine 101 according to this invention, first starter motor 152 is driven to rotate first flywheel 125 connected to it by means of a ring gear (not shown). At this time magnetic coil 129 mounted on cylinder block 107 is energized so that first power transmitting wheel 131 of power transmitting device 126 is coupled to first flywheel 125 because the ferrite magnetic inserts 130 of the first flywheel 125 are drawn to the magnetic coil 129.

Therefore, as soon as power transmitting shafts 134 and 135 are rotated in conjunction with crankshaft 110, if properly oriented, fire cylinder 105 will be ignited first and exploded to force reciprocating piston 113' to move downward. Then at 120 degrees rotation of crankshaft 110, fire cylinder 104 is ignited.

The waste heat gas generated by the explosion of two fire cylinders 104 and 105 is supplied through waste heat gas exhaust passage 169 to He gas heating chamber 121 of cylinder head block 108. At this time, the He gas passing through He gas pipes 116 is not expanded sufficiently to force reciprocating piston 112' to move downward. Accordingly, compressed air from compressed air tank portion 441 is supplied to vane motor 153 to rotate second flywheel 127 so that flywheel structure 102 provides the torque force necessary to alternately ignite the two fire cylinders 104 and 105.

Thereafter, the He gas is heated by the waste heat gas introduced into He gas heating chamber 121 of waste heat gas collecting cylinder 106 at a temperature of between 650 degrees and 950 degrees. The He gas is highly compressed by vane compressor 315 and as a result of the high temperature, is expanded in receiving chamber 112 to force reciprocating piston 112' to move downward.

At this time, a signal generated by an electronic sensor (not shown) mounted on crankshaft 110, activates solenoid intake and exhaust valves 317 and 321. Specifically, before reciprocating piston 112' rotates to 6 degrees to 8 degrees of TDC, solenoid valve 317 is opened to allow the He gas to be introduced into heating chamber 121.

When reciprocating piston 112' reaches TDC, the He gas is compressed and expanded. Then as reciprocating piston 112' moves downward, the He gas is rapidly expanded with maximum pressure being exerted at 15 degrees to 20 degrees TDC to force reciprocating piston 112' to move downward. The pressure of the He gas becomes so high with a pressure of 130 kg/cm$^2$ to 200 kg/cm$^2$, that solenoid exhaust valve 321 is opened before reciprocating piston 112' arrives at BDC. Of course solenoid intake valve 317 is shut.

Next, reciprocating piston 112' arrives at BDC and then moves upward again to supply the expanded He gas through He gas pipe 116 to heat exchanger 301, by way of solenoid valve 317 spring valves 320 and outlet valve 321. Therefore, the operation of composite engine 101 of this invention is similar to the operation of a conventional engine having three cylinders. The engine 101 increases the net thermal efficiency greater than that of a conventional engine, as shown in FIG. 7.

FIG. 7A is a graph showing the operation of a conventional, prior art engine having three fire cylinders. Power is represented by a thick line in which first fire cylinder is exploded at TDC and subsequently second and third fire cylinders are exploded after a period of rotation of 120 degrees of the crankshaft. Therefore the power applied to the crankshaft by each piston overlaps twice by 60 degrees between $2\pi$ and $4\frac{1}{3}\pi$ as shown in FIG. 7A'.

FIG. 7B is a graph showing the operation in which initially fire cylinder 3 is exploded and subsequently fire cylinders 2 and 1 are exploded at the period of 120 degrees and similarly the power transmitted to the crankshaft overlaps twice by 60 degrees as shown in FIG. 7B'.

The present invention has a power cycle as shown in FIG. 7C, 7C', 7D and 7D'. Namely, during the operation of composite engine 101, He gas is expanded in waste heat gas collecting cylinder 3 to force the reciprocating piston to move downward, and, after the period of 120 degrees, fire cylinders 1 and 2 are continuously exploded, whereby the power cycle for coordinating the waste heat gas collecting cylinder 3 with two fire cylinders 1 and 2 is accomplished. The waste heat gas collecting cylinder 3 of this invention allows a cylinder piston to complete a full operational cycle with one rotation of the crankshaft compared to the conventional 4-cycle fire cylinder engines which are designed so that a full piston cycle is completed only after two rotations of the crankshaft.

Thus, as shown in FIG. 7C' the power transmitted by a plurality of reciprocating pistons to the crankshaft overlaps twice by 60 degrees. Further, the power generated by the piston of the waste heat gas collecting cylinder is added to the crankshaft twice during one engine cycle. Here it is noted that the power transmitted to the crankshaft by the piston of the waste heat gas collecting cylinder is twice as great as that generated by the piston of the fire cylinder.

Similarly, it is noted in FIG. 7D that first fire cylinder 2 is exploded and subsequently the piston of waste heat gas collecting cylinder 3 is moved after a period of 120 degrees. Fire cylinder 1 is again exploded after the period of 120 degrees and additionally the He gas in the waste heat gas collecting cylinder is expanded after a period of 180 degrees. Thus, the power as shown in FIG. 7D' is produced. Of course this invention can be applied to a 4-cycle engine, as shown in FIG. 7, and can also be applied to a 2-cycle engine.

The power produced by composite engine 101 rotates crankshaft 110, operating power transmitting device dual flywheels 102 to rotate all gears in gear box 154. Therefore gears 163 and 165 drive motors 433 and 434 so that the He gas is supplied to vane compressor 435 to generate electric power by means of electric generator 436 connected to vane compressor 435.

Simultaneously, during the rotation of power transmitting shaft 135, bevel gear 158 is rotated and the driving apparatus (not shown) mounted behind electronic clutch 180 is operated. Bevel gears 161 and 162, engaged with bevel gear 158, operate air compressors 159 and 160, respectively, to store compressed air at compressed air tank portion 441. As soon as compressed air tank portion 441 can no longer store additional compressed air, electronic clutches 167 are operated so that bevel gears 161 and 162 are disengaged from compressors 159 and 160.

If propulsion is to be stopped, the electric power to magnetic coil 129 mounted on cylinder block 107 is cut off so that first power transmitting wheel 131, coupled with first flywheel 125, is detached from first flywheel 125 by means of return spring 146. The torque force of crankshaft 110 is no longer transmitted to second power transmitting wheel 133, thereby stopping the propulsion of the automobile. At this time, power transmitting device 126 according to the principal of this invention, is set so that magnetic coil 150 mounted on bracket 140 is energized to give electric magnetic inserts 151 of second flywheel 127 magnetic force. At this time, second power transmitting wheel 133 becomes coupled to second flywheel 127.

This invention provides marked advantages over conventional engines. For example, the He gas supplied to He gas expanding apparatus 401 is expanded by the waste heat gas by means of waste heat gas collecting cylinder 106, so that one portion of the expanded He gas drives vane motors 433 and 434, which allows vane compressor 435 to generate the electric power by electric generator 436, as well as to increase the inertial force of second flywheel 127. The other portion of the He gas is supplied to the second stage 439 of He gas turbine 437, to rotate the gears in gear box 154, thereby increasing the inertial force of second flywheel 127 and operating air compressors 159 and 160, thereby producing compressed air.

Thereafter, on starting the automobile again, the electric power to magnetic coil 150 of bracket 140 is cut off so that electromagnetic inserts 151 of second flywheel 127 no longer have magnetic force, thereby returning second power transmitting wheel 133 to the original position. Simultaneously, magnetic coil 129 of cylinder block 107 is energized so that first power transmitting wheel 131 is coupled to first flywheel 125, thereby driving the automobile.

5. Acting effect

As described above, this invention is provided with an internal combustion engine and an external combustion engine so that fuel can be saved by a number of external combustion engines arranged according to a predetermined design. Also, by utilizing the waste heat gas, power is increased in a manner that the fire cylinders of the internal combustion engine produce power on two rotations of the crankshaft and the cylinder of the external combustion engine produces power with one single rotation of the crankshaft enhancing the net thermal efficiency.

Further this invention is provided with an apparatus which utilizes heat radiation, such as the first subsystem and the second subsystem, so that energy is stored. Further, this invention adapts a new dual flywheel structure so that the torque force of the crankshaft is held uniform to reduce the difference of the time in transmitting power to the driving apparatus of the automobile, thereby distributing constant power and reducing engine vibration. As a result, this invention uses a first flywheel for the internal combustion engine and a second flywheel for the external combustion engine to obtain maximum inertial force in them so that the energy is effectively consumed and stored.

Below is a table of comparison between this invention and a conventional 4-cycle engine having 4 cylinders.

TABLE

| TYPE OF ENGINE | 4-CYCLE GASOLINE ENGINE | COMPOSITE ENGINE |
| --- | --- | --- |
| Bore × Stroke | 85 × 70 m/m | The external combustion engine 85 × 70 m/m<br>The internal combustion engine 120 × 70 m/m |
| Number of Cylinder | 4 cylinder | 3 cylinder |
| Piston displacement | 1588 cc | 1588 cc |
| Valve arrangement | OHV | OHV |
| Compression Ratio | 8.50 | 8.50 |
| Maximum pressure | 12.0 kg/cm at 250 rpm | 12.0 kg/cm at 250 rpm |
| Maximum horse power | 100 Hp at 5,500 rpm | 63 Hp (internal combustion engine) + 63 (external combustion engine) + 31.5 (subsystem) = 157.5 |
| Maximum Torque | 13.7 kg-m/rpm (3800 rpm) | 13.7 + 1.5 = 14.2 kg-m (3800 rpm) |

TABLE-continued

| TYPE OF ENGINE | 4-CYCLE GASOLINE ENGINE | COMPOSITE ENGINE |
| --- | --- | --- |
| Valve timing intake | open BTDC-16 close ABDC-54 | Same as conventional engine |
| Ignition time | 10 BTDC at 800 rpm | 10 BTDC at 800 rpm |
| Starter motor output (V-KW) | 12.0 volt/0.8 KW | 12.0 volt/0.8 KW |
| Cooling system | Water cooling | Water cooling |
| Radiator | 1 | 2 |
| Exhaust gas | 1 (assumed) | ½ |

Also, this invention can be adapted to a conventional engine comprised of one to sixteen or more cylinders or an in line type or V-type engine.

6. Other embodiments

As shown in FIG. 8, composite engine 500 is provided with one fire cylinder 501 and one waste heat gas collecting cylinder 502 mounted in one cylinder block. The waste heat gas from fire cylinder 501 is supplied to waste heat gas collecting cylinder 502 to expand the He gas from pipes 507 and then supplied through waste heat gas passage 504 to gas expanding apparatus 505 according to this invention. Thereafter the waste heat gas passing through He gas expanding apparatus 505 drives turbo charger 508 to inject the compressed air into fire cylinder 501, while the expanded He gas passing through a plurality of pipes 510 mounted in expanding apparatus 505 circulates in a closed loop as described in first embodiment.

In FIG. 9, composite engine 601 is provided with two waste heat gas collecting cylinders and three fire cylinders mounted in one cylinder block 602. Two fire cylinders 605 and 606 are mounted on both left and right sides of waste heat gas collecting cylinder 603 and one fire cylinder 608 is mounted on the right side of waste heat gas collecting cylinder 604.

Thus the waste heat gas from waste heat gas collecting cylinder 603 is supplied through He gas expanding apparatus 607 along with the waste heat gas from fire cylinder 608 to waste heat gas collecting cylinder 604 to smoothly move the piston of waste heat gas collecting cylinder 604. Next, all waste heat gas is supplied to He gas expanding apparatus 609, to drive turbo charger 614 connected to expanding apparatus 609, thereby injecting compressed air into three fire cylinders 605, 606 and 608. Here He gas pipes 610, 611, 612 and 613, consisting of a plurality of groups, are configured to have a closed loop path, thus permitting the He gas to operate the subsystem as described above.

In FIG. 10, composite engine 701 is provided with one waste heat gas collecting cylinder 703, two fire cylinders 704 and 705, and a He gas cylinder 706 in one cylinder block. The two fire cylinders 704 and 705 are mounted on both sides of waste heat gas collecting cylinder 703. He gas compressing cylinder 706 is mounted on the right side of fire cylinder 705.

Thus, the waste heat gas from two fire cylinders 704 and 705 expands the He gas, which is introduced through pipes 707 into waste heat gas collecting cylinder 703, to move the piston of waste heat gas collecting cylinder 703. Then the waste heat gas is passed through a He gas expanding apparatus 708 and turbo charger 720. At this time, the expanded He gas passing through plurality of pipes 709 installed in He gas expanding apparatus 708 is circulated in the subsystems as described above.

Turbocharger 720 injects compressed air into two fire cylinders 704 and 705. On the other hand, the He gas supplied from He supply tank 710 to waste heat gas collecting cylinder 703 is expanded in waste heat gas collecting cylinder 703 and discharged therefrom. The He gas is supplied through He gas chamber 711 and heat exchanger 712 to He gas compressing cylinder 706 to force the piston of compressing cylinder 706 to move downward. This embodiment, too, has a closed loop path for the He gas, as described above.

While there has been described what is at present considered to be the preferred embodiment of this invention, it will be understood that various modifications may be made therein, and it is intended to cover in the appended claims, all such modifications as fall within the true spirit and scope of this invention.

What is claimed is:

1. A composite engine system comprising
   a main engine having a cylinder block including two internal combustion cylinders and a waste heat gas collecting cylinder, a crankshaft, and plurality of pistons connected to said crankshaft and reciprocally mounted in said cylinders;
   a dual fly wheel structure coupled with said crankshaft and including a first flywheel secured to said crankshaft, a starter motor coupled to said flywheel, a second flywheel, a vane motor coupled to said second flywheel for operation thereby, a shaft extending through said flywheels and means for selectively coupling said shaft to a selective one of said flywheels;
   a gear box having a plurality of meshing gears therein, one of said gears being coupled to said shaft of said fly wheel structure;
   a first subsystem defining a first closed loop for passing a flow of helium gas into said waste heat gas collecting cylinder of said main engine for expansion therein, a radiator mounted on said cylinder block and a water loop for passing a flow of water through said radiator and in heat exchange relation with the expanded helium to cool the expanded helium; and
   a second subsystem including a helium gas expanding apparatus connected to said waste heat gas collecting chamber to receive a flow of expanded helium gas, a swash plate type external combustion engine connected to said gas expanding apparatus to receive the flow of helium gas, and electric generator drivingly connected to said swash plate engine to be driven thereby, a second closed loop for conveying a flow of helium through said apparatus for expansion therein and having a vane motor connected to a second gear of said gear box for driving said second gear in response to flow of the expanded helium through said vane motor, a third closed loop for conveying a flow of helium through said apparatus for expansion therein and having a turbine connected to a third gear of said gear box for driving said third gear, a heat exchanger connected to each of said second and third loops for cooling the helium therein, a vane compressor connected to one of said second and third loops to convey a flow of helium therethrough and an electric motor connected to said compressor to be driven thereby.

2. A composite engine system as set forth in claim 1 wherein said means of said dual flywheel structure includes a power transmitting device between said flywheels having a first power transmitting wheel for engaging said first flywheel for driving of an automobile and a second power transmitting wheel for engaging said second fly wheel for idle operation of the automobile.

3. A composite engine system as set forth in claim 1 wherein said first subsystem includes a supply tank of helium gas, a compressor connected to said tank to compress a flow of helium gas therefrom, a solenoid intake valve connected to said compressor to pass a flow of helium gas therethrough, a heat exchanger between said valve and said waste heat gas collecting cylinder and a solenoid exhaust valve between said intake valve and said supply tank for recirculating helium gas to said supply tank.

4. A composite engine system as claimed in claim 1 wherein said helium gas expanding apparatus includes a block having a passage for waste heat gas, a hollow gas expanding tank mounted at the center of said block two gas pipes for introducing gas into said tank two gas pipes for discharging gas from said tank, and a coil type pipe having a relatively smaller diameter and a coil type pipe having a relatively larger diameter concentrically around said gas expanding tank at the center.

* * * * *